United States Patent
Ye

(10) Patent No.: US 8,408,505 B2
(45) Date of Patent: Apr. 2, 2013

(54) DISPLAY SUPPORT DEVICE AND DISPLAY USING THE SAME

(75) Inventor: Zhen-Xing Ye, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 208 days.

(21) Appl. No.: 12/868,688

(22) Filed: Aug. 25, 2010

(65) Prior Publication Data

US 2012/0032038 A1    Feb. 9, 2012

(30) Foreign Application Priority Data

Aug. 5, 2010   (CN) .......................... 2010 1 0246197

(51) Int. Cl.
 *F16M 11/00*    (2006.01)
(52) U.S. Cl. ..................................... 248/161; 248/176.1
(58) Field of Classification Search ............... 248/176.1, 248/177.1, 158, 161, 405, 157, 127; 361/679.21, 361/679.22, FOR. 104; 211/107, 110, 207, 211/182
 See application file for complete search history.

(56) References Cited

U.S. PATENT DOCUMENTS

| 4,165,856 A * | 8/1979 | Wiseheart ...................... 248/449 |
| 7,300,029 B2 * | 11/2007 | Petrick et al. .............. 248/285.1 |
| 7,854,415 B2 * | 12/2010 | Holbrook et al. .......... 248/125.2 |
| 2006/0284031 A1 * | 12/2006 | Whalen et al. ............. 248/125.8 |
| 2009/0039212 A1 * | 2/2009 | Whalen et al. ................ 248/158 |

* cited by examiner

*Primary Examiner* — Alfred J Wujciak
(74) *Attorney, Agent, or Firm* — Altis Law Group, Inc.

(57) ABSTRACT

A display support device includes a fixing base, a connecting member mounted on the fixing base, a frame connected on the connecting member, and an expanding bracket mounted on the frame. The frame includes a hold plate. The hole plate defines two first slots. The expanding bracket includes two first expanding bars and two second expanding bars. Each of the first expanding bars defines a number of through holes. Each of the second expanding bars defines two second slots. A number of first fasteners slidably extend through the first slots and the second extending bars to adjustably mount the second expanding bars to the hold plate. And a number of second fasteners slidably extend through the second slots and the through holes of the first expanding bars and are mounted to a display.

10 Claims, 3 Drawing Sheets

DISPLAY SUPPORT DEVICE AND DISPLAY USING THE SAME

BACKGROUND

1. Technical Field

The present disclosure relates to a display support device.

2. Description of Related Art

Flat screen displays, such as popular liquid crystal displays, are commonly supported by a support that is set on a table, desk, or wall that can adjust the height and the view angle. Typically, the flat screen displays are fixed to the support by screws locked into screw holes that are defined in a back portion of the flat screen displays. However, different sized flat screen displays have different positions for the screw holes, so that different supports are needed to accommodate different sized flat screen displays, which limit the usage of the supports.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
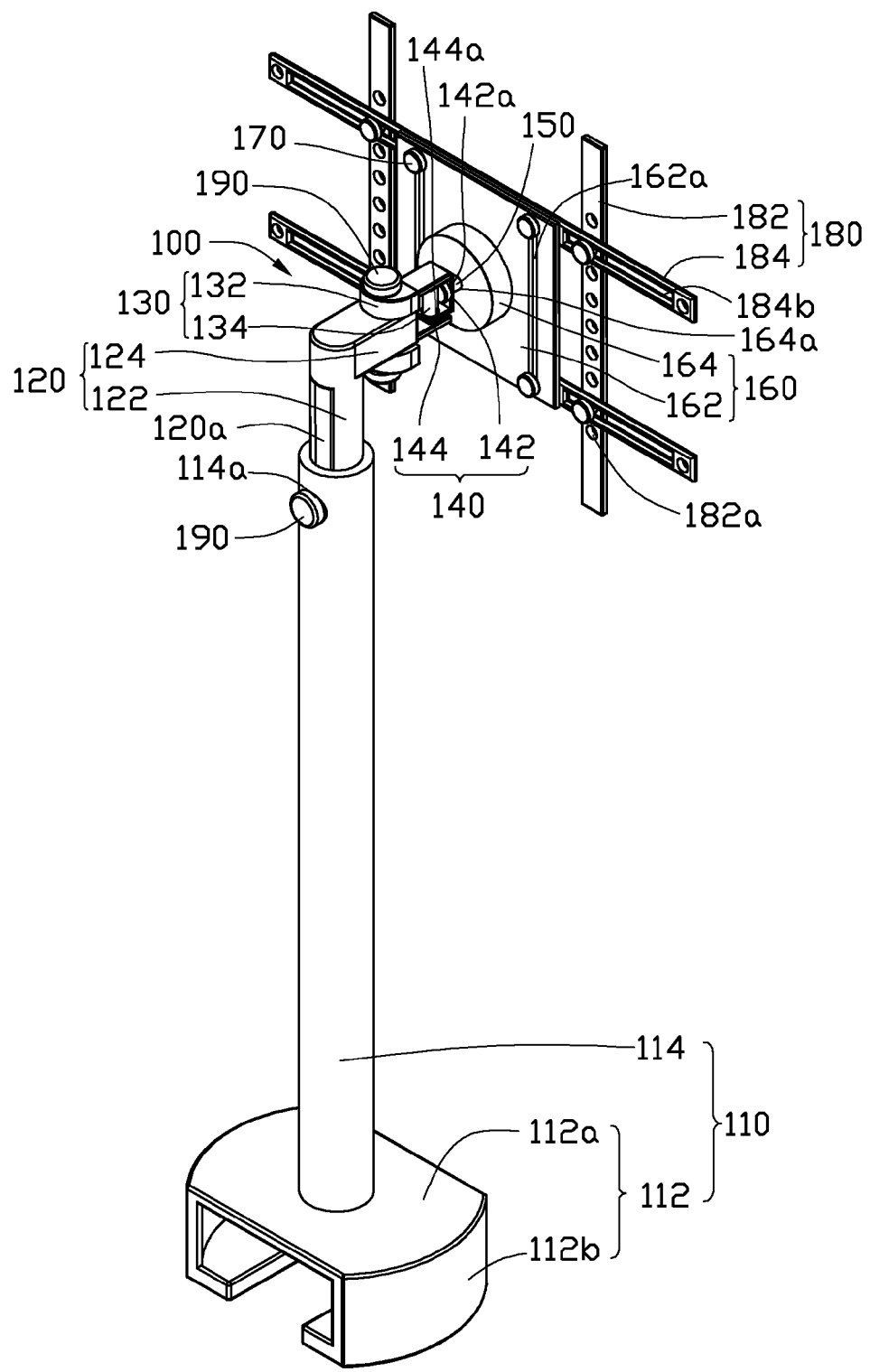
FIG. 1 is an isometric view of a display support device.
Figure 2:
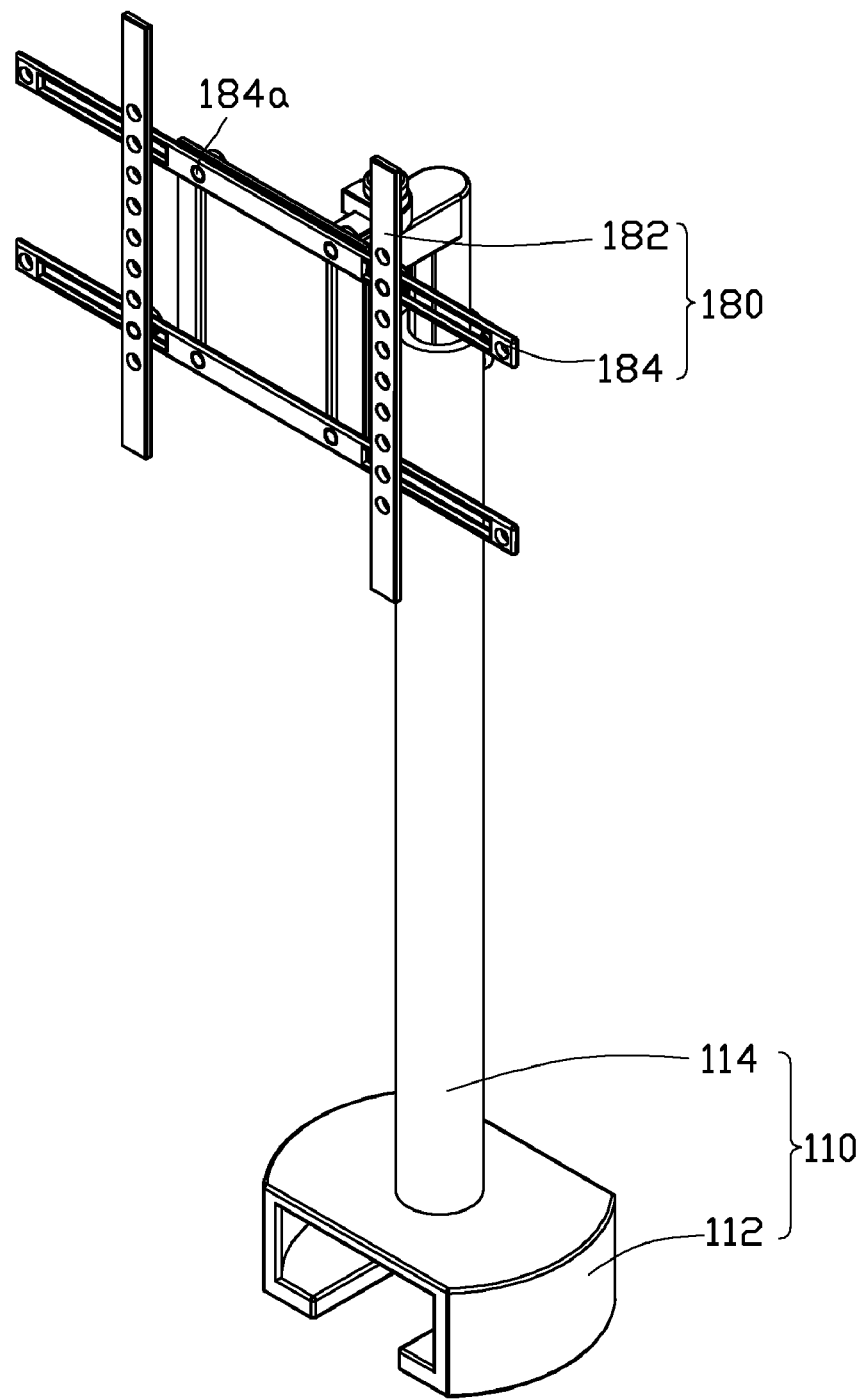
FIG. 2 is similar to FIG. 1, but viewed from another perspective.

Referring to FIGS. 1 and 2, an embodiment of a display support device includes a support base 110, a connecting member 100, a frame 160, a number of first fasteners 170, and an expanding bracket 180.

The connecting member 100 includes a telescopic rod 120, a connecting bracket 130, a clip 140, a connecter 150, and a number of second fasteners 190.

The fixing base 110 includes a substrate 112 and a hollow pole 114. The substrate 112 includes a connecting plate 112a and two approximately L-shaped latching plates 112b. The latching plates 112b is substantially perpendicularly positioned on opposite sides of the connecting plate 112a. The pole 114 is substantially perpendicularly mounted on the connecting plate 112a. A threaded hole 114a is defined in the periphery of the pole 114 and communicates with the inner space of the pole 114. In this embodiment, the display support device is set on the ground by the substrate 112. In other embodiment, the display support device can be hung on a ceiling or can be mounted to a sidewall of a house by the substrate 112.

The telescopic rod 120 is substantially L-shaped and includes a vertical sliding portion 122 slidably received in the pole 114 and a horizontal connecting portion 124. The sliding portion 122 defines a sliding slot 120a along the longitudinal direction. The fastener 190 extends through the threaded hole 114a and is adjustably fastened in the sliding slot 120a of the telescopic rod 120, thus adjustably positioning the telescopic rod 120 in the pole 114.

The connecting bracket 130 includes two overhanging arms 132 and a connecting pin 134 perpendicularly connecting the overhanging arms 132. The connecting portion 124 is sandwiched by the overhanging arms 132, and the overhanging arms 132 are adjustably mounted on the connecting portion 124 with the second screws 190.

The clip 140 includes an end plate 142 and two side plates 144 perpendicularly extending from two opposite sides of the end plate 142. A first hole 142a is defined in the middle of the end plate 142 for allowing the connecter 150 such as a bolt to pass through and pivotally connect the frame 160 to the clip 140. Two second holes 144a are respectively defined in the side plates 144 and aligned with each other. The clip 140 is pivotally mounted on the connecting pin 134 through the second holes 144a of the side plates 144.

The frame 160 includes a hold plate 162 and a circular bump 164 formed on the back of the hold plate 162. The hold plate 162 is substantially rectangular and defines two symmetrical slots 162a through the hold plate 162. A threaded hole 164a is defined in the middle of the bump 164 for mating with the connecter 150 thereby pivotally connecting the frame 160 to the clips 140.

The expanding bracket 180 includes two first expanding bars 182 and two second expanding bars 184. Each of first expanding bars 182 defines a number of through holes 182a. Each of the second expanding bars 184 defines two symmetrical mounting holes 184a and two symmetrical slots 184b, and the fixing holes 184a are positioned between the slots 184b. Four first screws 170 slidably extend through the slots 162a and lock into the four fixing holes 184a of second expanding bars 184, so that the second expanding bars 184 are perpendicular to the slots 162a and mounted on the hold plate 162. Four first fasteners 170 slidably extend through the four slots 184b of the second expanding bars 184 and engage in four of the through holes 182a to make the first expanding bars 182 substantially perpendicular to the second expanding bars 184 and fix a display 200 (shown in FIG. 3).

In another embodiment, the two slots 184b of each second expanding bars 184 may be joined together as one elongated slot, and the first fasteners 170 may extend through the slots 162a and the elongated slot 184b to mount the second expanding bars 184 to the hold plate 162.

Figure 3:
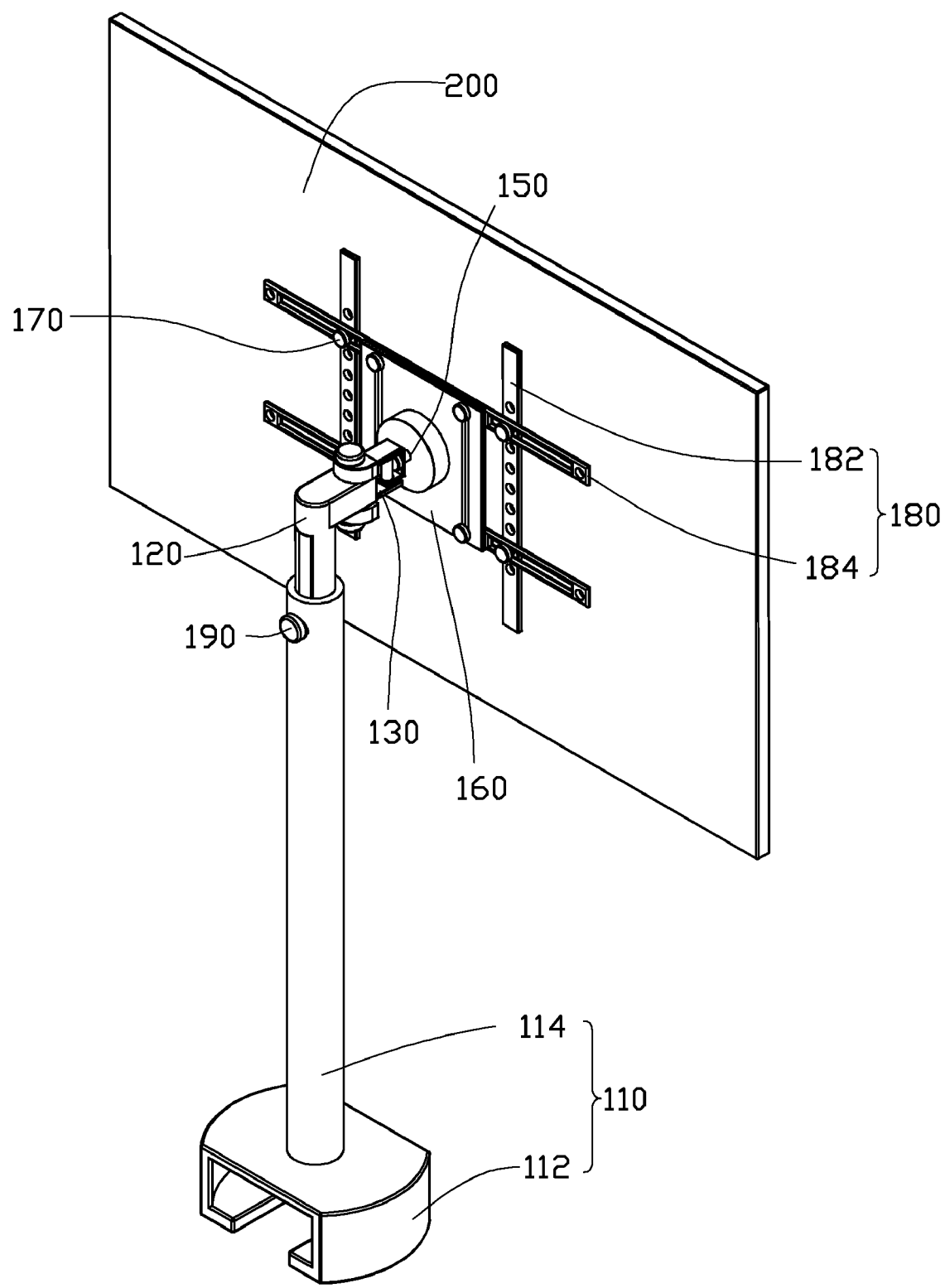
FIG. 3 is an isometric view of display being mounted to the display support device of FIG. 1.

Referring to FIG. 3, in use, the connecting pin 134 of the connecting bracket 130 serves as a pivotal shaft, which ensures the display 200 to be able to rotate at any desired angle in the horizontal plane. The connecter 150 serves as another pivotal shaft that ensures the display 200 to be able to rotate at any desired angle in a vertical plane perpendicular to the horizontal plane. The height of the display 200 relative to the fixing base 110 can be changed by moving the telescopic rod 120 relative to the pole 114 of the base 110. Furthermore, the first fasteners 170 are adjusted to change the distance between the first expanding bars 182 and the distance between the second expanding bars 184 to accommodate displays of different sizes.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A display support device comprising:
   a fixing base;
   a connecting member mounted on the fixing base;
   a frame connected on the connecting member, wherein the frame comprises a hold plate, the hold plate defines two first slots;
   an expanding bracket mounted on the frame, wherein the expanding bracket comprises two first expanding bars and two second expanding bars, each of the first expanding bars defines a plurality of through holes, each of the second expanding bars defines two second slots and two symmetrical fixing holes; and
   a plurality of first fasteners slidably extending through the first slots and locking into the four fixing holes of the second expanding bars to adjustably mount the second expanding bars to the hold plate, and a plurality of second fasteners slidably extending through the second slots and the through holes of the first expanding bars to be mounted to a display;
   wherein the connecting member comprises a telescopic rod mounted on the fixing base and capable of being moved upward or downward relative to the base, a connecting bracket mounted on the telescopic rod, a clip pivotally mounted on the connecting bracket, and a connector to make the frame rotatably mounted on the clip.

2. The display support device of claim 1, wherein the second expanding bars are parallel with each other and perpendicular to the first slots, and the first expanding bars are perpendicular to the second expanding bars.

3. The display support device of claim 1, wherein two symmetrical fixing holes of each of the second expanding bars are positioned between of two second slots.

4. The display support device of claim 1, wherein the fixing base comprises a substrate with a connecting plate and a hollow pole perpendicularly mounted on the connecting plate, and one end of the telescopic rod is adjustably received in the pole.

5. The display support device of claim 4, wherein the telescopic rod comprises a sliding portion received in the pole and defining a sliding slot, and a connecting portion perpendicular to the sliding portion, and a threaded hole is defined in the pole throughout a wall of the pole and communicates with the inner space of the pole for allowing a third fastener to extend through to press against the sliding slot, to fix and position the telescopic rod in the pole.

6. The display support device of claim 5, wherein the connecting bracket comprises two overhanging arms sandwiching the connecting portion and a connecting pin perpendicularly connecting the overhanging arms, and the clip is pivotally mounted on the connecting pin.

7. The display support device of claim 6, wherein the overhanging arms are adjustably mounted on the connecting portion via fourth fasteners.

8. The display support device of claim 6, wherein the clip comprises an end plate and two side plates perpendicularly connected to opposite end of the end plate; the end plate defines a first hole for the connecter passing through and pivotally connecting the frame to the clip; the side plates respectively defines a second holes which are aligned with each other; the clip is pivotally mounted on the connecting pin through the second holes of the side plates.

9. The display support device of claim 8, wherein a circular bump is formed on the back of the hold plate; the connecter is a bolt and the bump defines a threaded hole for mating with the bolt thereby pivotally connecting the frame and the clips.

10. The display support device of claim 4, wherein the substrate further comprises two substantially L-shaped latching plates perpendicularly positioned on opposite sides of the connecting plate.

* * * * *